(12) United States Patent
Lin et al.

(10) Patent No.: US 6,707,174 B2
(45) Date of Patent: Mar. 16, 2004

(54) MAGNETIC FLUX REGULATOR TO REDUCE PERFORMANCE CHANGE CAUSED BY AMP-TURN VARIATION

(75) Inventors: Yingjie Lin, El Paso, TX (US); Conrado Carrillo, Juarez (MX)

(73) Assignee: Delphi Technologies, Inc., Troy, MI (US)

( * ) Notice: Subject to any disclaimer, the term of this patent is extended or adjusted under 35 U.S.C. 154(b) by 129 days.

(21) Appl. No.: 09/955,755

(22) Filed: Sep. 19, 2001

(65) Prior Publication Data

US 2003/0052551 A1 Mar. 20, 2003

(51) Int. Cl.[7] ............................................. F16K 31/06
(52) U.S. Cl. ................... 310/17; 335/236; 123/90.11; 123/520; 251/129.15; 251/129.01
(58) Field of Search .................. 251/129.15–129.22, 251/129.01, 129.09; 310/12–14, 15, 17; 123/90.11, 520; 335/236, 237, 301

(56) References Cited

U.S. PATENT DOCUMENTS 4,954,799 A * 9/1990 Kumar ........................ 335/236
5,358,215 A * 10/1994 Buth et al. .............. 251/129.21

* cited by examiner

Primary Examiner—Nicholas Ponomarenko
Assistant Examiner—Judson H. Jones
(74) Attorney, Agent, or Firm—Jimmy L. Funke

(57) ABSTRACT

A valve assembly has a valve body defining a chamber with a controlled outlet. A stop and seat are spaced from each other and are supported within the chamber in axial alignment with the controlled outlet. A plunger reciprocably moves between the stop and the seat to open and close the controlled outlet through the operation of a solenoid assembly. The solenoid assembly includes a spool supported between two plates. An electrical coil is disposed around the spool for receiving electrical current and generating a magnetic flux. A primary magnetic flux loop forms a path around the spool, through the two plates, the plunger and the stop to move the plunger away from the controlled outlet. An annular magnetic flux regulator made of magnetic conductive material is disposed in the spool to provide a secondary bypass magnetic flux flow path for a portion of the generated magnetic flux during high amp-turn operating conditions. The magnetic flux flowing through the bypass path does not contribute to the magnetic force acting on the plunger.

8 Claims, 4 Drawing Sheets

MAGNETIC FLUX REGULATOR TO REDUCE PERFORMANCE CHANGE CAUSED BY AMP-TURN VARIATION

TECHNICAL FIELD

The present invention relates to control valves, and in particular an evaporative (EVAP) solenoid control valve having a plunger to open and close a controlled passageway therein and a magnetic flux regulator to regulate the magnetic force applied to the plunger.

BACKGROUND OF THE INVENTION

It is known in the art of automotive fuel systems to use an evaporative (EVAP) solenoid valve assembly to control the flow of fuel vapor through passage ways connecting a purge canister and an intake manifold. Many control valve assemblies, including EVAP control valve assemblies, are activated by a solenoid assembly supported within the valve. The solenoid assembly, in turn, is actuated in response to a pulse width modulated (PWM) signal generated by the vehicle's central computer to induce a plunger to open a passageway for the flow of vapor.

The performance of PWM voltage controlled magnetic actuators depends upon the operation temperature and input voltage level. Because automotive operating temperatures can range from approximately −40° C. to 150° C., and the resistance and current in the coil of the magnetic actuator change with the operating temperature of the vehicle, the magnetic force acting on the valve assembly may vary over 400%.

In present designs the magnetic force has been saturated to reduce the change of the magnetic force on the valve. Although this method has improved the operation of the valve, there still remains a significant variation of the magnetic force on the valve.

SUMMARY OF THE INVENTION

The present invention addresses the aforementioned concerns by providing a bypass configuration of the magnetic circuit of the valve assembly. In general the valve assembly includes a valve body defining a chamber with a controlled outlet. A stop and a seat are supported within the chamber of the valve body and are in axial alignment with the controlled outlet. A plunger moves reciprocably between the stop and the seat to open and close the controlled outlet in response to actuation of a solenoid assembly.

The solenoid assembly has a spool supported between a primary and secondary plate and an electromagnetic coil wound about the spool for receiving electrical current and producing a magnetic flux. The magnetic flux has a primary magnetic flux flow path about the electric coil wherein the primary magnetic flux flow path loops through the secondary plate through a sleeve, from the sleeve to the primary plate, through the plunger and the stop and from the stop back through the secondary plate. The solenoid assembly further includes means for providing a secondary bypass magnetic flux flow path for a portion of the magnetic flux. According to one aspect of the invention the means for providing the secondary bypass magnetic flux flow path includes a magnetic flux regulator positioned in the spool for directing a portion of the magnetic flux away from the plunger.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
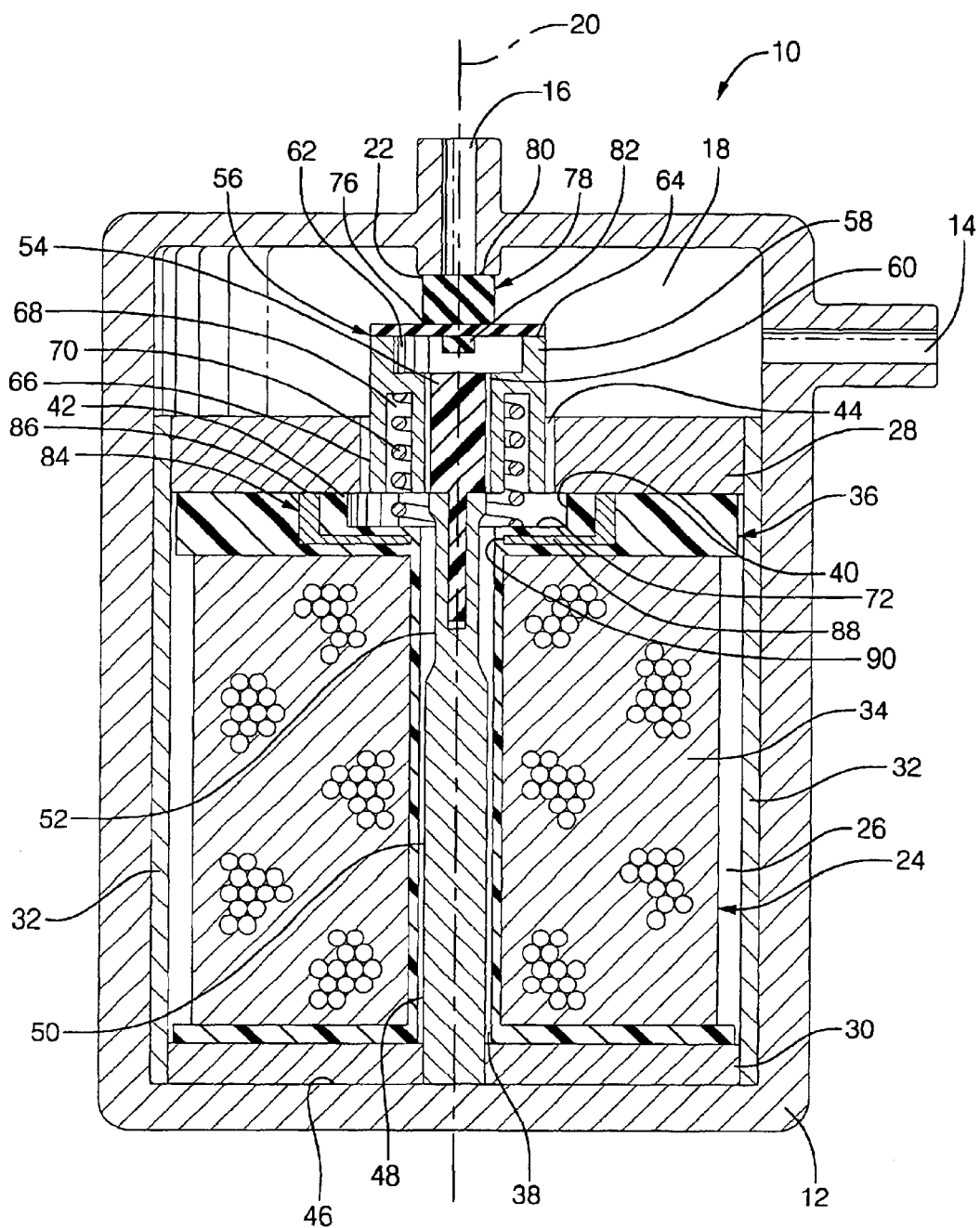
FIG. 1 is a cross sectional view of an EVAP valve assembly according to the present invention.

A solenoid-actuated valve assembly 10 for use in a fuel system is shown in FIG. 1 and includes a valve body 12 that defines an inlet 14, a controlled port 16 and a chamber 18 therebetween wherein the inlet 14 is connectable to a filtration canister (not shown) and the port 16 is connectable to an intake manifold (not shown). The controlled port 16 is formed on an axis 20 and extends into the chamber 18 to define a seat 22 at the interface between the controlled port 16 and the chamber 18.

The valve body 12 also houses a solenoid assembly 24 within a cavity 26 formed adjacent the chamber 18, the cavity 26 being defined by a primary plate 28, a secondary plate 30, and a sleeve 32. The solenoid assembly 24 includes an electromagnetic coil 34 wound about a spool 36 supported between the primary and secondary plates 28, 30, respectively. The spool 36 has a central bore 38 positionable coaxial with axis 20 when the spool 36 is assembled within the body 12. The bore 38 opens into an annular recess 40 formed in an end 42 of the spool 36 adjacent the primary plate 28. The annular recess 40 is further aligned coaxially with an opening 44 formed in the primary plate 28. Thus, the central bore 38, the recess 40 of the spool 36 and the primary plate opening 44 are all in axial alignment with the controlled port 16.

Affixed to an end 46 of the valve body 12 opposite the seat 22 along axis 20 is a stop 48. The stop 48 includes a conductive body 50 which is received within the central bore 38 of the spool 36, to engage against stop 48. The conductive body 50 includes a tapered end portion 52 extending into the recess 40 of the spool end 42. A plastic insert 54 is affixed to the tapered end 52 of the conductive body 50 and extends through the opening 44 of the primary plate 28 into the chamber 18.

A plunger 56, movable between the seat 22 and stop 48 to open and close the controlled port 16, is situated within the opening 44 of the primary plate 28. The plunger 56 includes an annular body 58 defining a central bore 60 sized to receive the plastic insert 54 and tapered end 52 of the conductive body 50. The central bore 60 of the plunger body 58 opens into a recess 62 formed in an end 64 of the plunger body 58 proximal the seat 22. An opposite end 66 of the plunger body 58 proximal the stop 48 includes an annular slot 68 extending radially within the plunger body 58 for a predetermined width and axially for a predetermined depth. The annular slot 68 is adapted to receive a spring 70 with one end supported against a base 72 of the recess 40.

Spanning the end 64 of the plunger body 58 proximal the seat 22 is a flexible disk shaped spring or washer 74 having an aperture 76 coaxially aligned with axis 20. A resilient tip 78 is received within the aperture 76 and has a surface 80 sealable in engagement with the valve seat 22 and a cushion 82 formed on an opposite side of the spring 70 proximal the valve stop 48.

Figure 2:
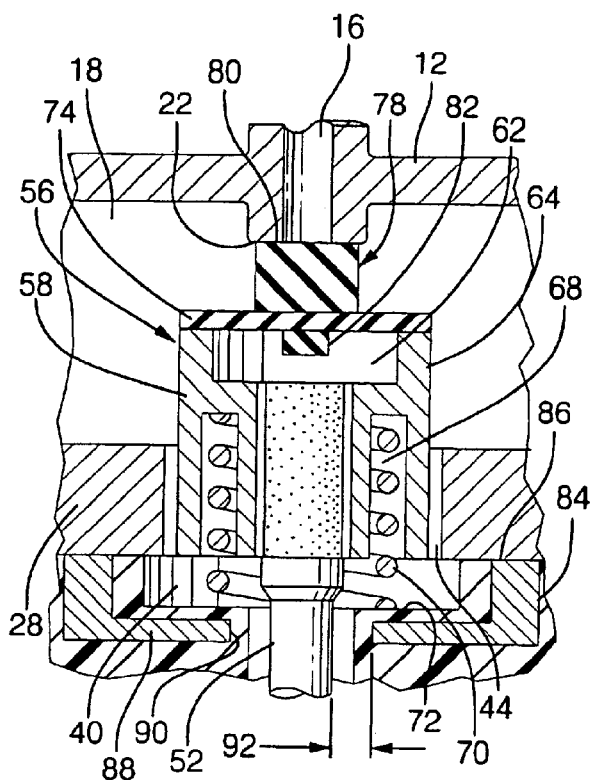
FIG. 2 is an enlarged cross sectional view of a portion of the EVAP valve assembly of FIG. 1 showing the plunger normally positioned to close a controlled port.
Figure 3:
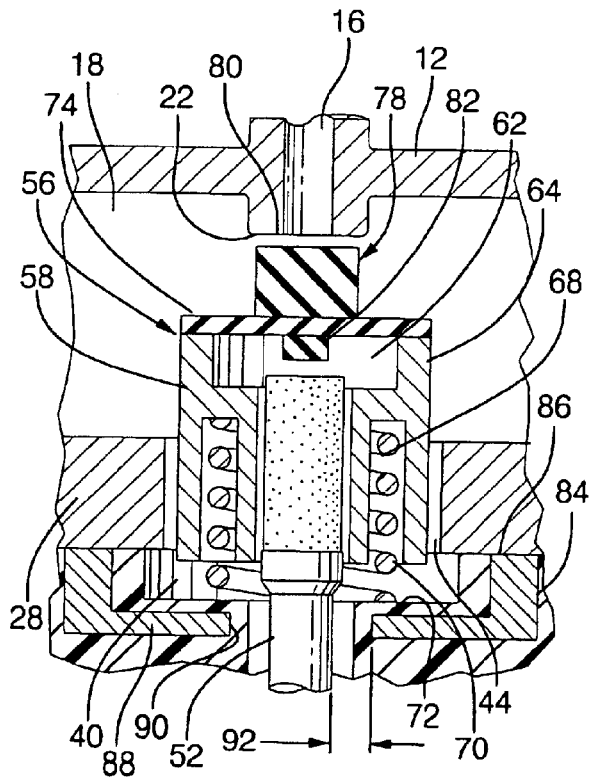
FIG. 3 is an enlarged cross sectional view of a portion of the EVAP valve assembly of FIG. 1 showing the plunger positioned toward a stop to open the controlled port.

As shown in FIGS. 2 and 3, the plunger 56 reciprocates between the seat 22 and the plastic insert 54 of the stop 48, operating to open and close the controlled port 16, so that vapor passing into the chamber 18 from the filtration canister through the inlet 14 is selectively released through the controlled port 16 into the intake manifold. Normally, the surface 80 of the resilient tip 78 of the plunger 56 is seated against the seat 22 to close the controlled port 16 as shown in FIG. 2. In other words, the solenoid control valve 10 is spring biased to a normally closed position as illustrated in FIG. 2. After receiving a pulse-width modulated signal generated by the central computer of the vehicle (not shown), the solenoid assembly 24 energizes, creating a magnetic field operable on the plunger 56, that causes the plunger 56 to gradually move toward the stop 48. Accordingly, FIG. 3 illustrates the plunger body 58 moving through the opening 44 of the primary plate 28 and the recess 40 of the spool 36 toward the conductive body 50. As shown in FIG. 3, the stop cushion 82 of the plunger 56 eventually impacts the plastic insert 54 of the stop 48. When the solenoid 24 de-energizes, the pre-load magnetic forces of the spring 70 against the base of the recess 40 urge the plunger 56 back toward the seat 22 to close the controlled port 16 (FIG. 2).

To regulate the magnetic flux magnetic force on the plunger 56 when the solenoid assembly 24 is energized, the solenoid assembly 24 includes a magnetic flux regulator 84 to direct a portion of the magnetic flux to a secondary or bypass path. The spool 36 includes the magnetic flux regulator 84 embedded therein. The magnetic flux regulator 84 is an annular conductive insert preferably made of a ferromagnetic material, although the magnetic flux regulator 84 may be made of other soft magnetic material, such as steel. The magnetic flux regulator 84 is positionable coaxial with axis 20. The magnetic flux regulator 84 has an edge portion 86 communicating with the primary plate 28 and another portion 88 extending parallel to the primary plate 28. The parallel portion 88 of the magnetic flux regulator 84 terminates at an end 90 positionable at a predetermined distance from the conductive body 50 of the stop 48. As illustrated in FIG. 2, the distance or gap 92 between the end 90 of the parallel portion 88 of the magnetic flux regulator 84 and the conductive body 50 controls the amount of magnetic flux that will flow through the magnetic flux regulator 84.

Figure 4:
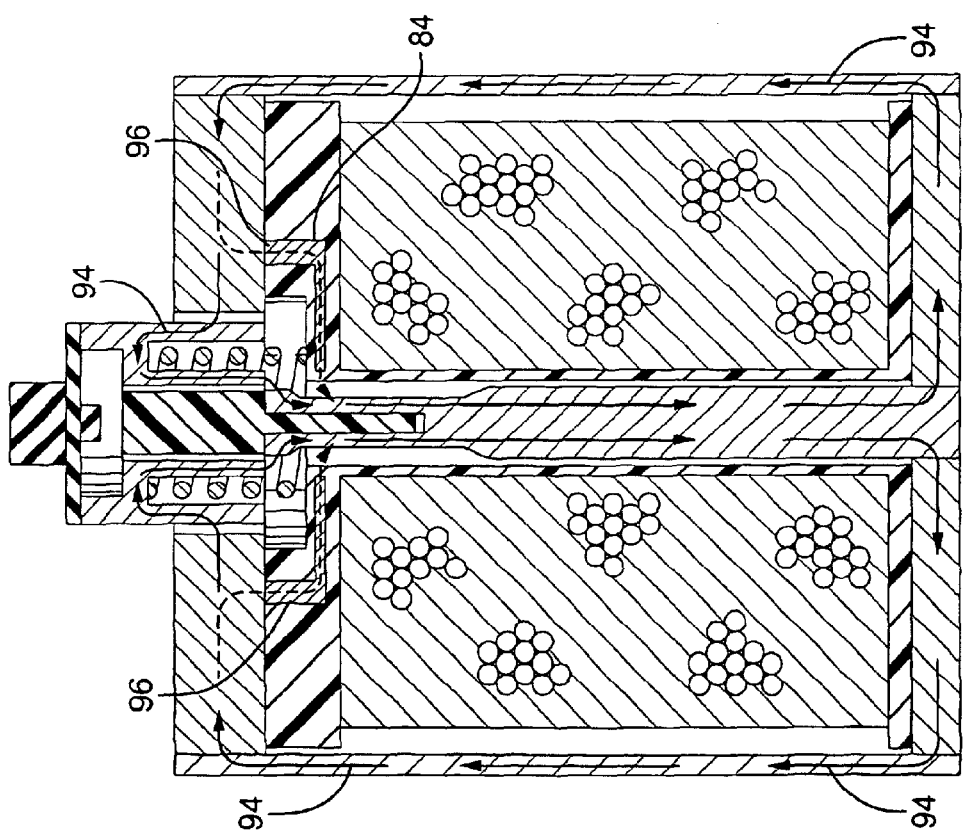
FIG. 4 is a cross sectional view of a portion of the EVA[valve assembly of valve 1 showing the magnetic flux paths during a low amp-turn condition.

When the coil 34 is energized, the magnetic attraction on the plunger 56 depends on the change of magnetic flux over a small change of the position of the plunger 56. When the vehicle operating temperature is high and the input voltage is low, then the electrical current is low, as well as the amp-turn of the coil. Because the gap 92 between end 90 of the magnetic flux regulator 84 and the conductive body 50 of the stop 48 is relatively large, the total amount of magnetic flux generated through the plunger 56 and the conductive body 50 of the stop 48 is relatively small when the amp-turn is low. Because the amount of magnetic flux through the magnetic flux regulator 84 is small, the magnetic circuit performs very similarly to a magnetic circuit without a magnetic flux regulator. Therefore, the magnetic force on the plunger 56 is only slightly reduced. The magnetic flux paths through the valve 12 during a low amp-turn condition is shown in FIG. 4. Most of the magnetic flux forms a loop through the secondary plate 30 to the sleeve 32 and through the primary plate 28. From the primary plate 28 most of the magnetic flux flows through the plunger 56 to the conductive body 50 of the stop 48 and again to the secondary plate 30. A small portion of the magnetic flux splits from the primary path and flows through the magnetic flux regulator 84 from the secondary plate 28 to the conductive body 50 of the stop 48. The portion of the magnetic flux going through the magnetic flux regulator 84 does not affect the movement of the plunger 56. The primary magnetic flux path through the plunger 56 and stop 48 is illustrated by arrows 94. The magnetic flux bypass or secondary path through the magnetic flux regulator 84 is illustrated by arrows 96.

Figure 5:
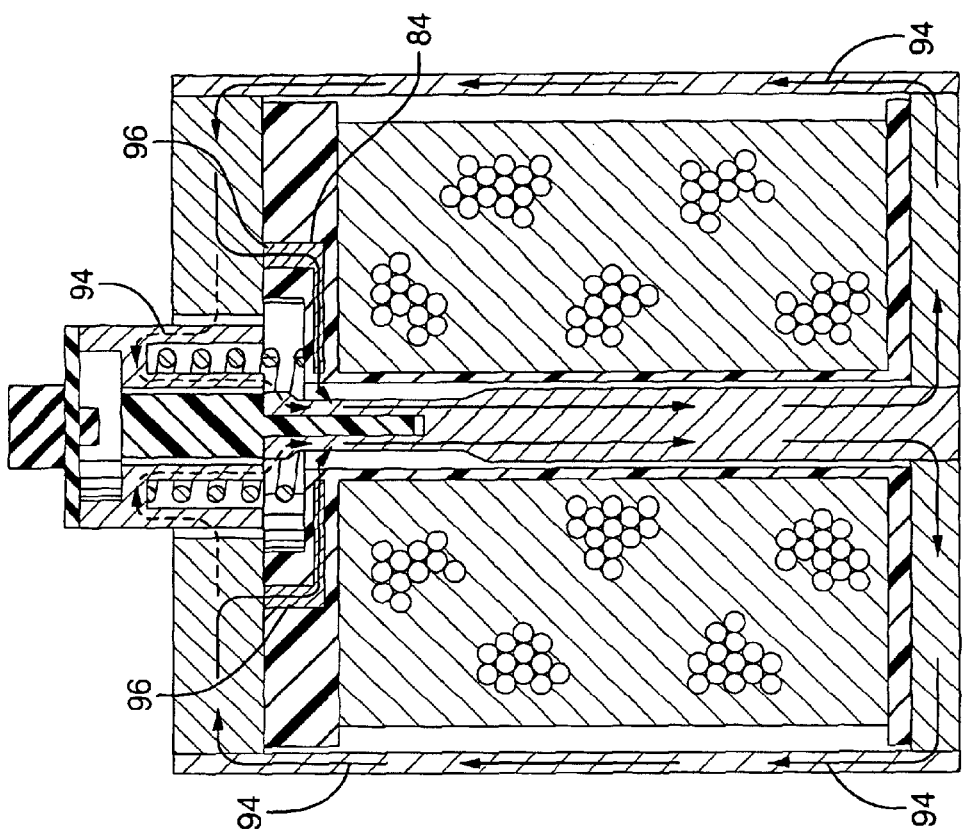
FIG. 5 is a cross sectional view of a portion of the EVAP valve assembly of FIG. 1 showing the magnetic flux paths during a high amp-turn condition.

If the operating temperature is low and the input voltage is high, the electrical current will also be high. In this condition the magnetic flux regulator 84 operates as a magnetic flux bypass. A larger portion of the magnetic flux will go through the bypass or secondary path of the magnetic flux regulator 84 which will not contribute to the magnetic force on the plunger 56. A smaller portion of the magnetic flux will flow through primary path 94 through the plunger 56 and stop 48 to act upon the plunger 56. The magnetic flux paths during a high amp-turn condition is shown in FIG. 5. In FIG. 5, the bold arrows 96 indicate the increase of magnetic flux through the magnetic flux regulator 84 in comparison to the amount of magnetic flux flowing through the magnetic flux regulator 84 as illustrated in FIG. 4.

To further help reduce the magnetic force on the plunger 56 during high amp-turn conditions, the stop 48 is configured to have a tapered end 52 on the conductive body 50. During high amp-turn conditions, all the portion of magnetic flux through the bypass path jump to the tapered end 52 and contribute to saturate this section so that the total magnetic flux of the magnetic circuit is limited.

Figure 6:
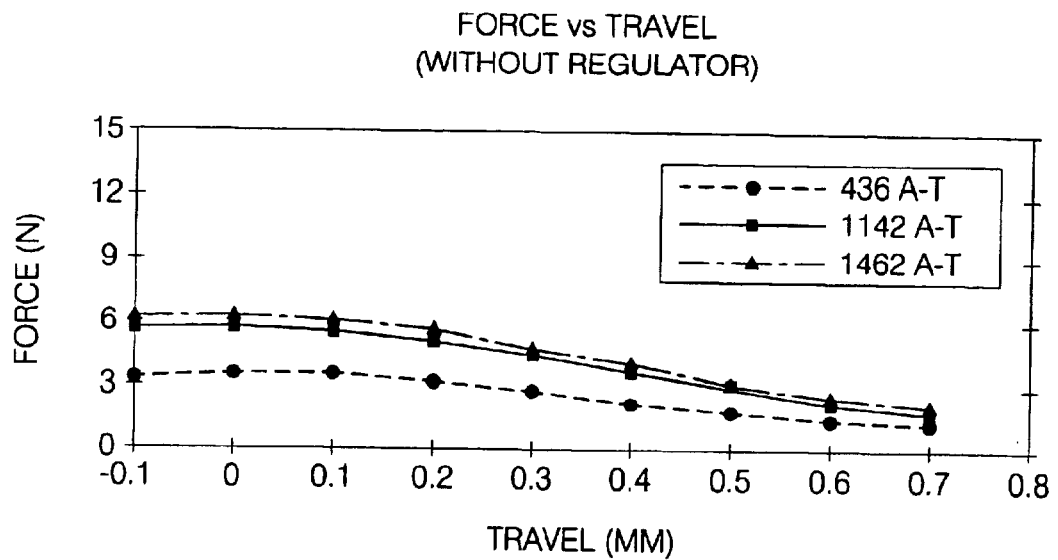
FIG. 6 is a graph of the magnetic force operable on a plunger over a travel distance under three different amp-turn conditions wherein the magnetic circuit does not include the magnetic flux regulator.
Figure 7:
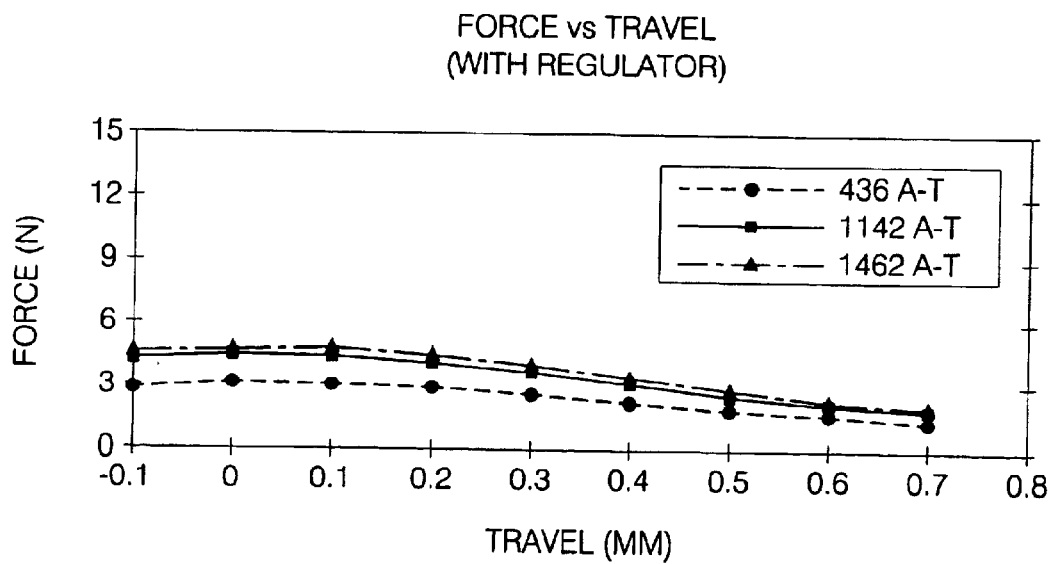
FIG. 7 is a graph of the magnetic force operable on a plunger over a travel distance under three different amp-turn conditions wherein the magnetic circuit includes the magnetic flux regulator of the present invention.

Simulation studies have been conducted to measure the magnetic force versus the travel distance of the plunger 56 on the aforementioned valve assembly at various amp-turn conditions. FIGS. 6 and 7 show the results without a magnetic flux regulator and with a magnetic flux regulator, respectively at 436, 1142 and 1462 amp-turns. As seen in FIG. 6 (without a magnetic flux regulator), before the plunger 56 moves away from seat 22 (−0.1 to 0.1 min. of travel) the magnetic force generated by the magnetic circuit has approximately a 200% increase at the higher amp-turn conditions (at 1142 and 1462 amp-turns) than at 436 amp-turns. In FIG. 7 (with a magnetic flux regulator) the magnetic force, at the same conditions as supra, increases only approximately 50%. In addition, there is little difference of the magnetic force exerted on the plunger 56 throughout the travel of the plunger 56 between the magnetic circuit without a magnetic flux regulator and with a magnetic flux regulator when the current is low. Therefore, as stated supra, in low amp-turn conditions, the magnetic circuit having a magnetic flux regulator functions similar to the magnetic circuit without a magnetic flux regulator.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Accordingly, it is to be understood that the present invention has been described by way of illustration and not limitation.

What is claimed is:

1. A valve assembly comprising:

a valve body defining a chamber with a controlled outlet;

a stop and a seat supported within the chamber of the valve body in axial alignment with the controlled outlet;

a plunger reciprocably movable between the stop and the seat to open and close the controlled outlet respectively; and a solenoid assembly operable on the plunger to move the plunger between the stop and the seat, said solenoid assembly having a spool supported between a primary and secondary plate, said spool having an electromagnetic coil wound thereon for receiving electrical current and producing magnetic flux, wherein magnetic flux produced by said electrical coil flows in a primary magnetic flux flow path about said electrical coil, said primary magnetic flux flow path extending from said secondary plate through a sleeve, from said sleeve to said primary plate and through said primary plate to said plunger to said stop, and through said stop back through the secondary plate, wherein the solenoid assembly includes means for providing a secondary bypass magnetic flux flow path for a portion of the magnetic flux and wherein the means for providing the secondary magnetic flux flow path includes a magnetic flux regulator to form a short cut loop to bypass the plunger.

2. The valve assembly of claim 1, wherein the magnetic flux regulator has a first end portion communicating with the primary plate and has another end portion spaced from the stop.

3. The valve assembly of claim 1, wherein the magnetic flux regulator is made of magnetic conductive material.

4. The valve assembly of claim 3, wherein the magnetic flux regulator is an annular member disposed within the spool.

5. The valve assembly of claim 2, wherein the spool has a center bore for receiving a portion of the stop therein, said stop having a conductive body with a reduced area adjacent said spool.

6. The valve assembly of claim 5, wherein the stop includes a resilient insert molded into the reduced area of the conductive body.

7. The valve assembly comprising:

a valve body defining a chamber with a controlled outlet;

plunger reciprocably movable within the chamber to open and close the controlled outlet;

a solenoid assembly operable to move the plunger upon receipt of electrical current to produce a magnetic flux having a primary path through the plunger and a secondary path bypassing the plunger.

8. The valve assembly of claim 7 further comprising means for limiting the total amount of magnetic flux produced by the electrical current.

* * * * *